March 22, 1938.  A. B. COLE  2,112,068
SOLDERING IRON
Filed March 28, 1936
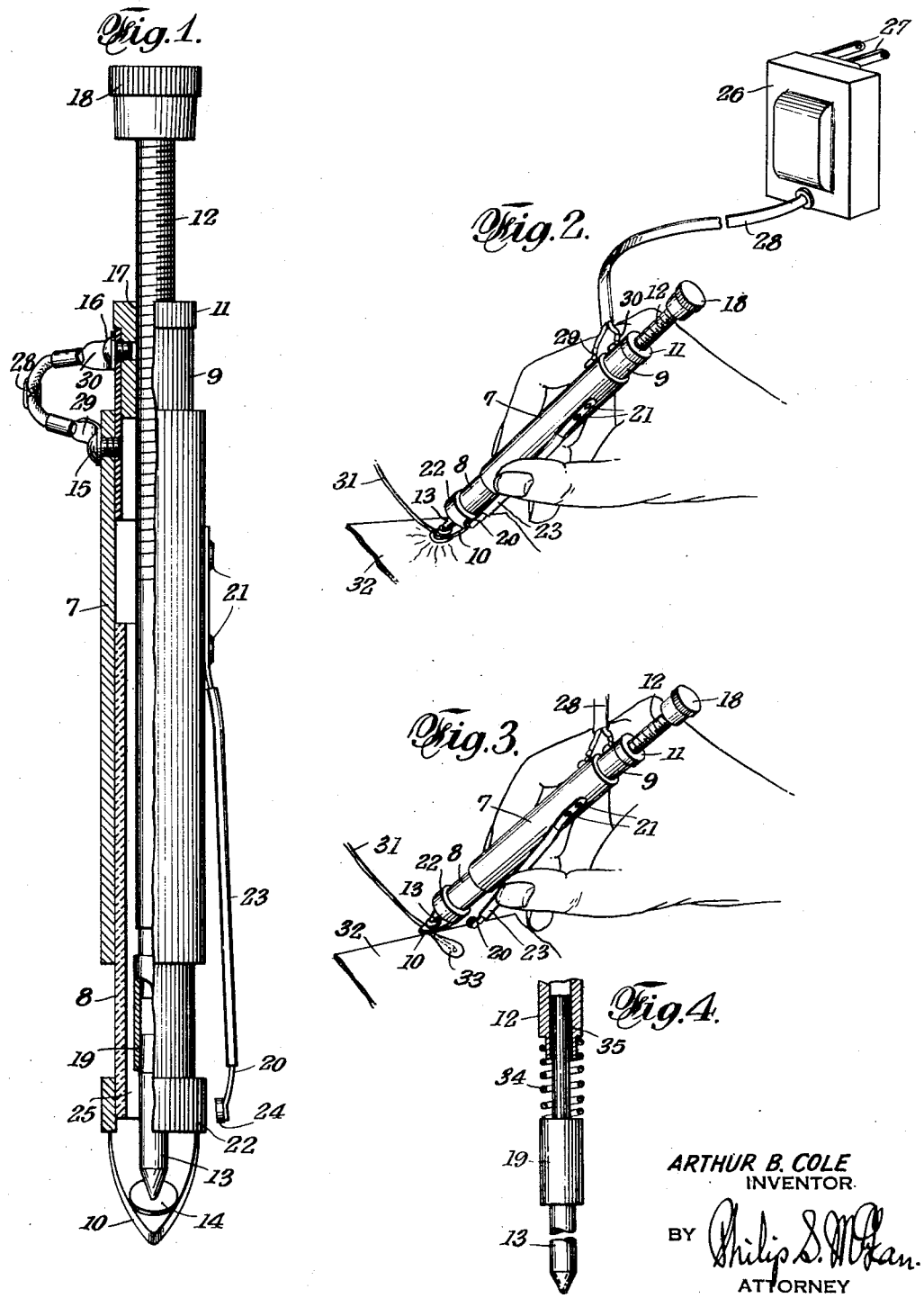
ARTHUR B. COLE
INVENTOR
BY Philip S. McLean.
ATTORNEY Patented Mar. 22, 1938

2,112,068

UNITED STATES PATENT OFFICE 2,112,068

SOLDERING IRON

Arthur B. Cole, Bloomfield, N. J.

Application March 28, 1936, Serial No. 71,475

7 Claims. (Cl. 219—26)

This invention relates to tools in the nature of soldering irons.

An objection to ordinary electric soldering irons is that they take too long to reach a soldering heat and then cool off too slowly. This makes them particularly unsuited for small soldering jobs, where perhaps only one or only a few wires are to be soldered. In such cases, the heating time may be much longer than the actual period of use and then practically as great additional time is required before the tool is cool enough to be put away.

The principal objects of this invention are to provide a soldering tool, which will heat quickly and which will cool at a desirably rapid rate and to attain these advantages with a simple, practical, inexpensive construction, which may be plugged into any ordinary electric service outlet and may be efficiently controlled to accomplish various kinds of soldering and kindred work.

A further special object is to provide a tool of the above character, which may be controlled and used for reaching in and soldering more or less inaccessible parts and for then holding the parts together until the solder starts to harden.

Other objects and the novel features of construction, combinations and relations of parts, comprising the invention are set forth and will appear in the following specification.

The drawing accompanying and forming part of this specification illustrates one practical commercial embodiment of the invention, but it will be appreciated as the invention is understood that structural features may be modified and changed all within the true intent and broad scope of the invention as defined in the claims.

Fig. 1 is a broken longitudinal sectional view of the tool separate from its electrical supply connections.

Fig. 2 is a broken perspective view, illustrating the complete device as in use, plugged into an ordinary wall outlet.

Fig. 3 is a broken view similar to Fig. 2, showing the control switch open and the tool, as it cools off being used to hold the parts of the just completed soldered joint. Fig. 4 is a detail of a modification.

In Fig. 1, the tool is shown as consisting of a metallic sleeve 7, forming a handle member and carrying in its opposite ends tubular insulators 8 and 9, with the first of these supporting a soldering point or "bit" 10, and the other supporting a mounting 11, for rod 12, carrying a conductor 13, making a high resistance contact with the back of the soldering point at 14.

The insulator 9, is shown as secured in the end of the handle sleeve by a screw 15, forming one electric terminal and the rod support 11, is shown as secured in the insulator 9, by a screw 16, providing the other terminal of the tool.

The rod 12 is shown as screw-threaded and the mounting member is illustrated as correspondingly screw-threaded at 17, so that by turning the rod, as by means of a knob 18, on the outer end of the same, the high resistance conductor may be adjusted in respect to the contact piece 14.

The conductor 13 may be a relatively small diameter carbon pencil and the same is indicated as removably mounted in a taper seat 19, at the inner end of the adjustable supporting rod 12.

The operating circuit is closed in the present illustration by a spring switch lever 20, suitably secured to the metallic sleeve 7, at 21, and having its lower end positioned to make contact with the sleeve portion 22, of the bit or tip 10. The switch arm is shown as encased by a cover 23, to protect the finger operating this lever from heat creeping up this arm from the soldering point. To prevent or reduce this transfer of heat, the switch arm may be tipped with a contact 24, of nickel or other metal of poor thermal conductivity.

To prevent or reduce flow of heat from the high resistance conductor 13, and the rod supporting the same, a definite air space 25, may be provided within the handle about these parts and if desired, this air space may be opened out through the upper end of the handle to provide free circulation of cooling air.

To enable use of the tool on the ordinary electric service lines, usually 110 volts A. C., there is provided, as a part of the tool, a special stepdown transformer 26, having in the primary side of the same blades 27, for plugging into a standard electric service outlet and having extended from the secondary side of the same a flexible electric cord 28, ending in terminals 29, 30, held by the terminal screws 15, 16.

To use the tool on an ordinary lighting circuit therefore, it is only necessary to plug the transformer into a service outlet. Then when the switch 20 is closed by pressure of the thumb or one of the fingers holding the tool, a low voltage circuit, usually about six or seven volts will be established through the high resistance contact at the back of the soldering point. The heat developed by this high resistance connection is sufficient to bring the soldering tip quickly to a soldering temperature, particularly with a construction such as that disclosed where the soldering tip is of relatively light and fairly thin construction, so that the heat developed at the back connection quickly penetrates to the soldering face. This relatively light construction also enables the point to cool rapidly. The lower insulator which carries the soldering point may be a tube of porcelain or other refractory insulation adapted to stand the heat and serving also to an extent to thermally insulate the point from the holding portion of the handle. The carbon pencil forming the high resistance contact conductor may be pointed to form the high resistance connection and the screw supporting rod provides a practical and convenient means for effecting the proper adjustment of this contact point. This adjustment ordinarily should be such that the carbon point simply makes firm engagement with the contact stud on the back of the soldering tip. Any burning away of the carbon point or contact tip may be quickly compensated for. By use of the finger switch, the soldering point may be heated for each soldering operation, or be kept heated at the proper temperature for a number of soldering operations.

In Fig. 2, the device is shown as being employed for effecting a connection between a wire 31, and a plate 32. As the solder "sweats" in making such a joint, pressure of the thumb may be released to open the secondary high resistance contact circuit as in Fig. 3, and then as the joint and the tool commence to cool and the solder starts to take hold, the tool may be slipped back from over the actual joint at 33, to still hold the parts in place up to the time that the solder is sufficiently strong for that purpose. This characteristic of quick heating and cooling, with the convenient switch control is of special advantage for securing wires and other connections in more or less remote places. The relatively small size of the tool also is of advantage under such conditions, enabling the tool to reach in and hold the parts together, then to be heated for effecting flow and penetration of the solder and finally to be used for holding the parts while cooling.

If desired, the metal sleeve of the handle may be sheathed in insulating material, so that the hand holding the tool will not be in contact with the operating circuit. It will be noted that the parts being operated upon form no part of the operating circuit even though engaged by the soldering point forming part of the operating circuit. The construction of the switch may be modified as by locating the make and break point at the upper end of the switch connection 20, and by providing a push button or equivalent for convenient operation of such switch. The handle construction illustrated is desirable, in that it may be made up of more or less standard tubular stock materials requiring but little machining, but if desired, the body of the handle may be made up of insulating material with the several conducting parts molded or otherwise secured in position. Combined as illustrated with the stepdown transformer, the tool may simply be plugged in and used at any ordinary electric service outlet. If however the lower voltages are available, the interposed transformer connection may be eliminated and the tool be directly connected with the current source.

While six or seven volts has been mentioned as suitable for operating the tool, it will be understood that other voltages may be employed. Higher voltage for example, may be used where more intense heat is desirable as for soldering bodies of high thermal capacity.

In the present invention, the tip of the tool may carry a coating, forming a supply of solder, like an ordinary soldering iron and the heat from the imperfect high resistance or concentrated resistance contact is applied to the work indirectly, that is, through the intervening metal of the tip. Thus there is no deposit of carbon, oxidation or melting of the parts, such as results where the piece to be soldered is made an essential part of the electric circuit and heat is developed as by means of a carbon rod held in contact with the piece.

While a plain screw adjustment is simple and practical, a spring may be interposed for holding the carbon electrode in contact with the tip, such as indicated at 34, Fig. 4, the tension of such spring being adjustable by means of the screw adjusting rod 12, which carries it through the telescopic connection at 35. Various other changes may be made, as will be evident from the scope of the claims.

What is claimed is:

1. An electric soldering iron, comprising a handle, a tubular insulator at one end of same, a soldering point on said insulator and arranged with the back of the same opposite the passage in said tubular insulator, a high resistance contact conductor in said passage, means for engaging said conductor with the back of said soldering iron and including a screw stem, and an electric terminal member on said handle provided with a screw seat for said screw stem.

2. An electric soldering iron, comprising a handle composed of metallic tubing and tubular insulation secured in opposite ends of the same, a soldering point carried by the tubular insulation at one end, a terminal member carried by the tubular insulation at the opposite end, a high resistance contact conductor in electrical connection with said terminal member and projecting through the tubular insulation at the opposite end into heating contact engagement with the soldering point, a terminal on the metallic handle sleeve, an electrical connection between said handle sleeve and the soldering point, including a switch arm.

3. An electric soldering iron, comprising a handle composed of metallic tubing and tubular insulation secured in opposite ends of the same, a soldering point carried by the tubular insulation at one end, a terminal member carried by the tubular insulation at the opposite end, a high resistance contact conductor in electrical connection with said terminal member and projecting through the tubular insulation at the opposite end into heating contact engagement with the soldering point, a terminal on the metallic handle sleeve, an electrical connection between said handle sleeve and the soldering point, the electrical connections from the terminal to the high resistance conductor including a screw rod, the high resistance conductor being mounted on the inner end of said screw rod, the first mentioned terminal having a screw seat for said screw rod and an exposed adjusting knob on the outer end of said screw rod.

4. An electric soldering iron, comprising a handle composed of metallic tubing and tubular insulation secured in opposite ends of the same, a soldering point carried by the tubular insulation at one end, a terminal member carried by the tubular insulation at the opposite end, a high resistance contact conductor in electrical connection with said terminal member and projecting through the tubular insulation at the opposite end into heating contact engagement with the soldering point, a terminal on the metallic handle sleeve, an electrical connection between said handle sleeve and the soldering point, including a switch arm having a contact point of low thermal-conductivity for engagement with said soldering point.

5. An electric soldering iron, comprising a handle composed of metallic tubing and tubular insulation secured in opposite ends of the same, a soldering point carried by the tubular insulation at one end, a terminal member carried by the tubular insulation at the opposite end, a high resistance contact conductor in electrical connection with said terminal member and projecting through the tubular insulation at the opposite end into heating contact engagement with the soldering point, a terminal on the metallic handle sleeve, an electrical connection between said handle sleeve and the soldering point, said soldering point comprising a ring-shaped portion engaged over the tubular insulation, a tip part extending from said ring-shaped portion radially inwardly into line with the bore in the tubular insulation and a contact on the back of said inwardly extending portion in position for engagement by the end of the high resistance conductor, said electrical connection including a spring switch lever between said handle sleeve and said ring shaped portion of the soldering point.

6. An electric soldering tool, comprising a tubular insulator, a ring-shaped metallic support engaged over one end portion of said tubular insulator, a soldering tip projecting from one side of said ring-shaped support beyond the end of said tubular insulator and extending radially inwardly toward the center of said tubular insulator, a high resistance contact electrode extending through the tubular insulator into engagement with the back of said soldering tip, means for connecting said electrode and said soldering tip in an electric circuit, including a terminal adjacent the opposite end of said tubular insulator, a switch lever interposed between said tip supporting member and said terminal and a second terminal electrically connected with said electrode and supported in insulated relation with said first terminal.

7. An electric soldering tool, comprising a tubular sleeve-like handle structure, a soldering tip supported in insulated relation at one end of said sleevelike handle structure, a screw seat supported in insulated relation at the opposite end of said handle structure, a screw stem adjustably engaged in said screw seat and extending inwardly through the handle structure, a high resistance contact electrode carried by the inner end of said screw stem in cooperative relation with said insulated soldering tip, a movable switch member on said tubular handle structure cooperable with said insulated soldering tip and terminals on the tubular handle structure, in electrical connection with said screw seat and switch lever respectively.

ARTHUR B. COLE.